UNITED STATES PATENT OFFICE.

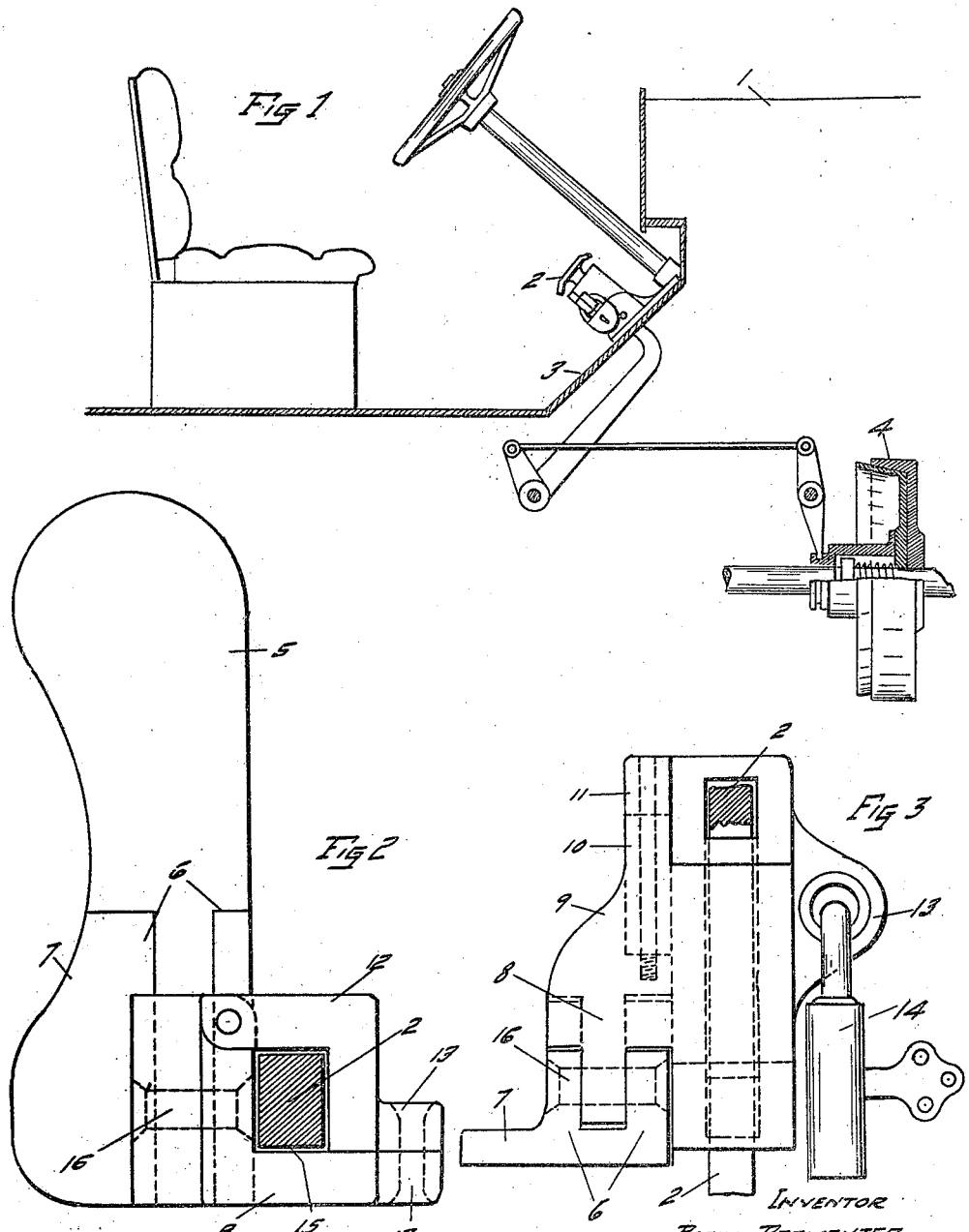

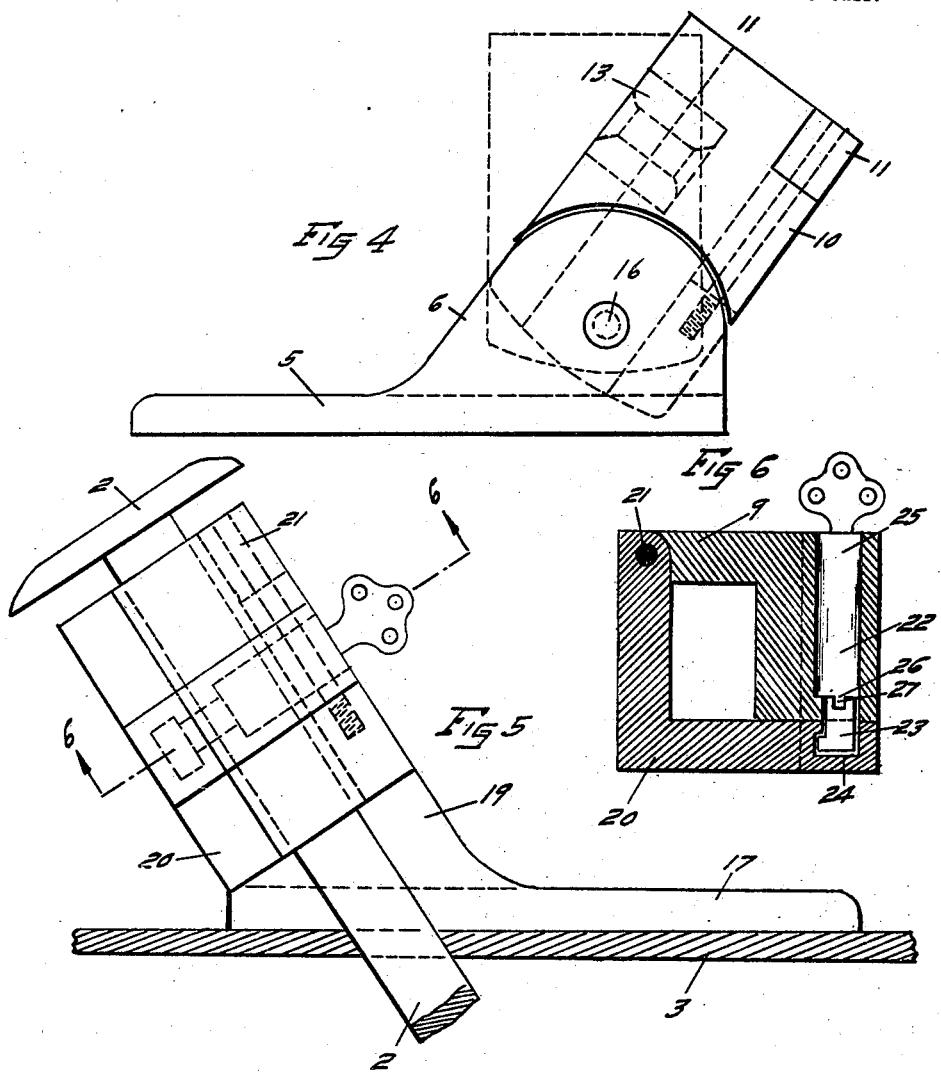

BRADY PARMENTER, OF BIRMINGHAM, ALABAMA, ASSIGNOR TO A. L. ATWOOD, OF BIRMINGHAM, ALABAMA.

ANTITHEFT DEVICE FOR AUTOMOBILES.

1,380,010.  Specification of Letters Patent.  Patented May 31, 1921.

Application filed July 21, 1919. Serial No. 312,302.

*To all whom it may concern:*

Be it known that I, BRADY PARMENTER, a citizen of the United States of America, residing at Birmingham, in the county of Jefferson and State of Alabama, have invented certain new and useful Improvements in Antitheft Devices for Automobiles, of which the following is a specification.

My invention relates to a device for preventing the unauthorized use of automobiles, that is to say, to provide a safety lock appliance which will prevent the theft of the car or the use of it after the device is applied.

More particularly the object of my invention is to provide a small, conveniently applied, easily locked and inexpensive device for preventing the operation of the clutch pedal so that having applied it with the gears in neutral position it will be practically impossible to drive the car so as to use it for unauthorized "joy riding" or to steal the car.

More particularly the object of my invention is to provide a sectional collar or chock adapted to be placed and locked about the clutch pedal shank and extending from the pedal to the floor, thus securely preventing the manipulation of the pedal.

A further object is to design a locking device of this character with a clutch shank engaging element hinged to a base or floor engaging element, thus adapting the appliance to set itself to the various angles of clutch pedals in current use.

My invention also contemplates the provision of means comprising either a pad lock or a contained cylinder lock for securing the clutch pedal chock in operating position.

My invention also comprises the novel details of construction and arrangements of parts, which in their preferred embodiments only are illustrated in the accompanying drawings, in which:—

Figure 1 is a sectional view through the floor of the car showing the clutch pedal with my invention applied.

Figs. 2, 3 and 4 are enlarged end plan and side views, respectively, of the appliance shown in Fig. 1.

Fig. 5 is a side view of a modified type of clutch pedal lock.

Fig. 6 is a section taken on the line 6—6 of Fig. 5.

Similar reference numerals refer to similar parts throughout the drawings.

I have illustrated my invention in connection with a typical automobile 1 having therein any standard type of clutch pedal 2 which projects through the car floor 3 and is adapted to manipulate the clutch 4 in the usual manner to open the clutch on the forward stroke of the pedal. My invention forms a device for preventing the manipulation of the clutch pedal and in the form illustrated in Figs. 2 to 4 comprises a base 5 provided with a pair of integral vertical spaced hinge lugs 6, one of which is disposed along one side edge of the base while the other is spaced inwardly from the outwardly flaring side extension 7 of the base. These lugs 6 are adapted to receive between them a perforated ear 8 cast integral with the relatively fixed top clamp or chock section 9. This section is provided with perforated lugs 10 spaced to receive a hinge lug 11 on the relatively movable clamp or chock element 12. The two relatively movable chock elements are provided with perforated locking ears 13 adapted to receive a pad lock 14 to secure them in closed position. The meeting faces of the members 9 and 12 are provided with a longitudinal recess 15 therethrough large enough to receive the standard sizes of clutch pedal shanks. The ear 8 is adapted to be pivotally secured between the lugs 6 by a rivet hinge pin 16 which permanently secures the base and clamp sections together. The distance from the base to the top of the clamp or chock section is substantially equal to the distance between the underside of the pedal on the upper end of the clutch shank and the floor. It therefore follows that when the clamp or chock is locked in operating position about the clutch pedal shank the pedal cannot be operated to release the clutch and therefore it is not practical to drive the car with the clutch so locked.

In Figs. 5 and 6 I show a modified structure comprising a base 17 integral with the relatively fixed clamp or chock member 19 corresponding to 9, to which member 19 is pivotally connected a relatively movable clamp or chock section 20 corresponding to 12, the two sections 19 and 20 being pivotally connected by a rivet hinge pin 21. In this construction the fixed member 19 is provided with a cored chamber 22 to form a keeper for the lock bolt 23, which bolt is mounted to turn in a counter-bored chamber 24 in the movable element 20, the outer end of this chamber being filled with the barrel of a pin or like lock 25, the bolt of this lock being in the form of a flat pin 26 which is adapted to fit into a socket 27 in the inner head of the bolt and to turn the bolt with it. In this arrangement the chock is designed and cast to fit the average clutch pedal and will contain a high grade lock so as to secure it in position about the clutch pedal.

It is apparent that my invention can be easily applied and removed by one having the appropriate key but that it is protected overhead by the pedal proper from attack by tools and is in a most inconvenient position for a mechanic to attempt to open it with the only tools which will serve the purpose. I consider therefore that to all practical purposes the chock cannot be removed except at a shop without injuring or breaking the clutch pedal.

This invention is not intended to be restricted in scope to the specific embodiments shown, but contemplates such modifications as come within the spirit and scope of the claim.

What I claim as new and desire to secure by Letters Patent, is:—

A device for locking a foot pedal of an automobile comprising an elongated base portion adapted to be disposed at one side of the pedal to be locked, and provided with raised hinge lugs rounded overhead, a sleeve for the pedal comprising hinge members adapted to embrace the clutch pedal, key controlled lock means to fasten said sleeve sections in position about the pedal, a lateral offset on one of the sleeve members overlying the rounded hinge lugs on said base and having a hinge lug adapted to be interposed between the base lugs, a pivot to connect said lugs together with the curved abutting faces of the lugs and shoulders concentric with the pivot, said device when applied to the pedal being adapted to prevent its depression to change its operating position.

In testimony whereof I affix my signature.

BRADY PARMENTER.

Witness:
  NOMIE WELSH.